Jan. 23, 1940.    J. R. EAID    2,187,938
SHOCK ABSORBER HUB
Filed May 16, 1935    3 Sheets-Sheet 1
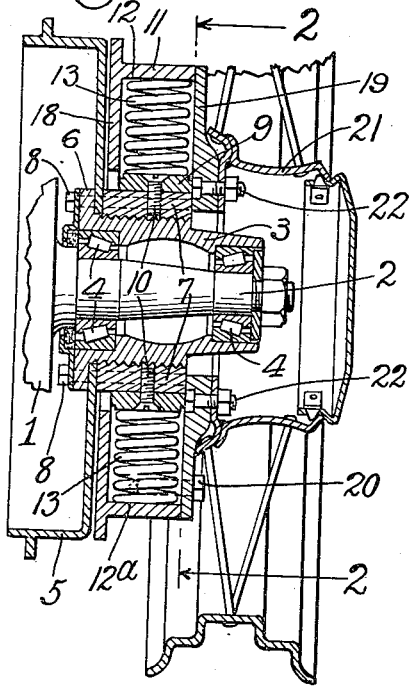
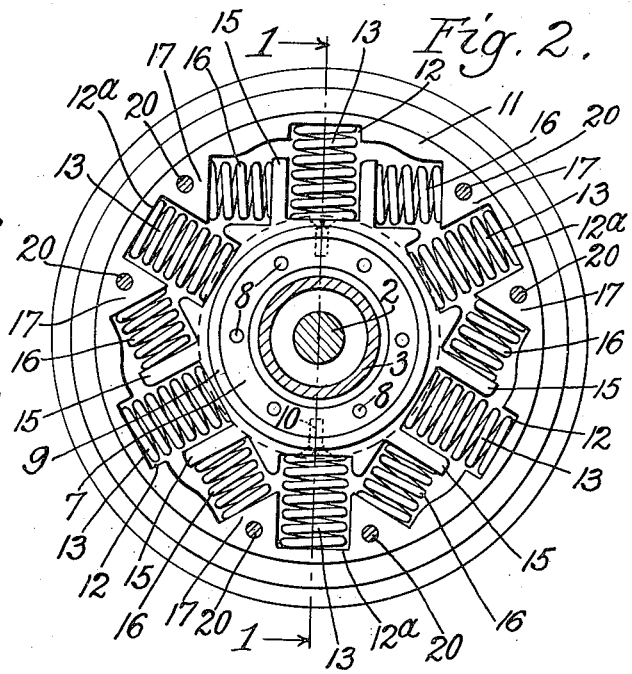
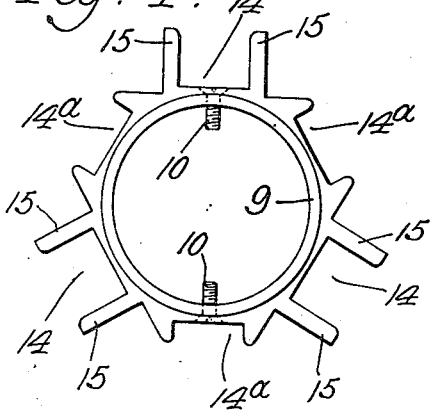
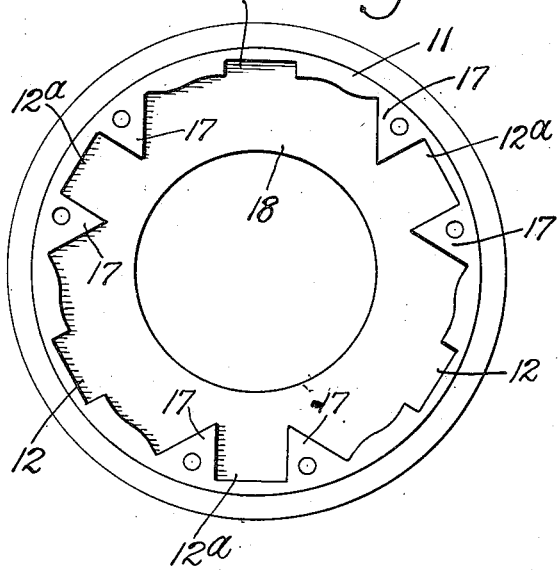
Inventor
John R. Eaid
by Parker & Carter
Attorneys.

Jan. 23, 1940.  J. R. EAID  2,187,938
SHOCK ABSORBER HUB
Filed May 16, 1935  3 Sheets-Sheet 2
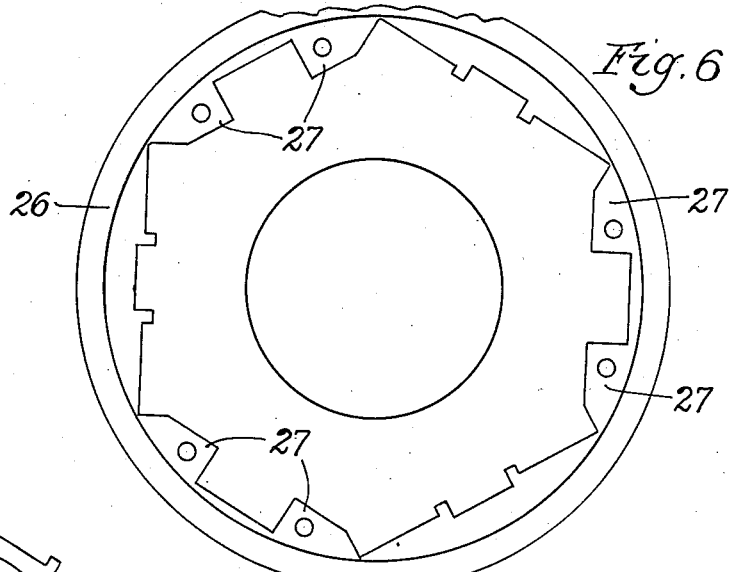
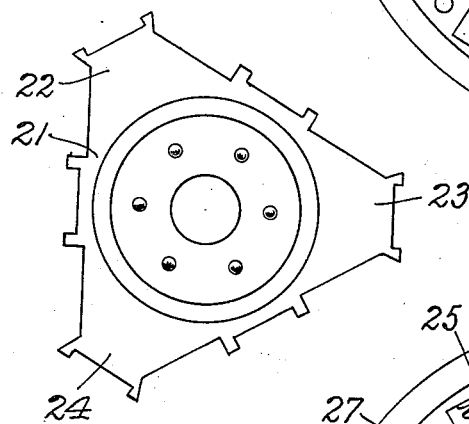
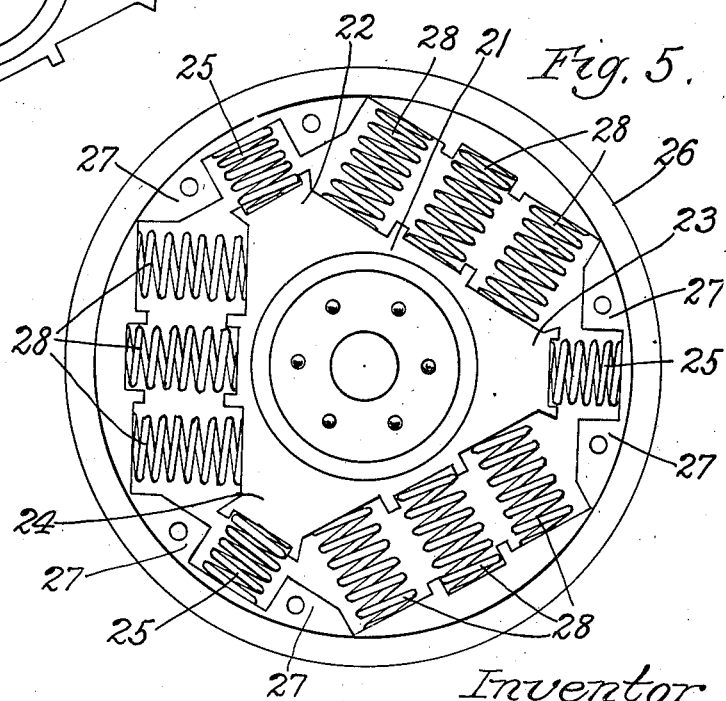
Inventor
John R. Eaid
by Parker & Carter
Attorneys.

Jan. 23, 1940.  J. R. EAID  2,187,938
SHOCK ABSORBER HUB
Filed May 16, 1935  3 Sheets-Sheet 3
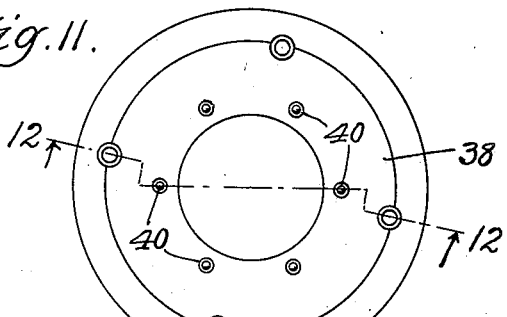
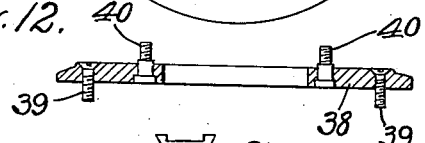
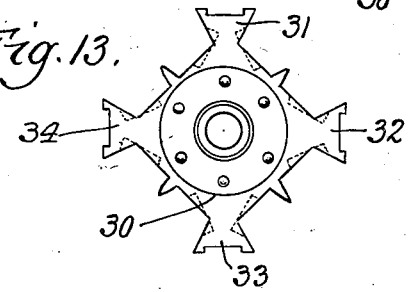
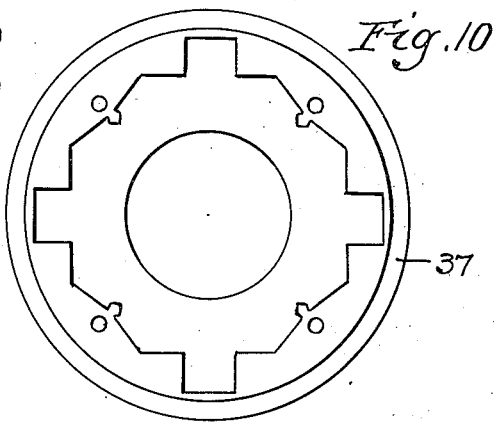
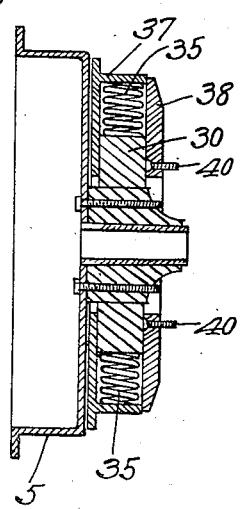
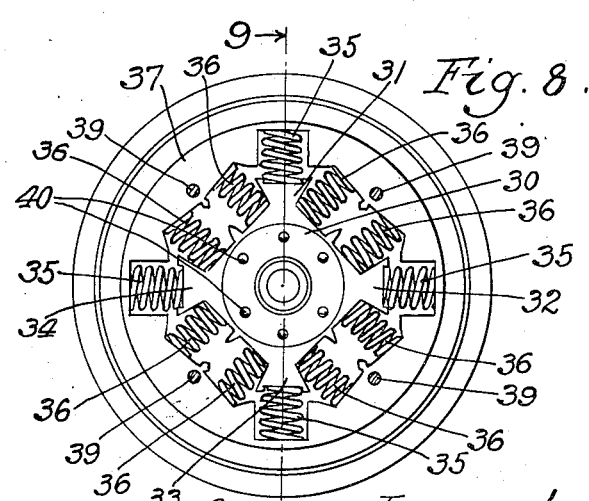
Inventor
John R. Eaid
by Parker & Carter
Attorneys.

Patented Jan. 23, 1940

2,187,938

UNITED STATES PATENT OFFICE 2,187,938

SHOCK ABSORBER HUB

John R. Eaid, Chicago, Ill., assignor to Samuel A. Ziegler, as trustee

Application May 16, 1935, Serial No. 21,717

4 Claims. (Cl. 152—112)

This invention relates to shock absorber hubs for wheels and has as its object to provide a new device of this description.

The invention has as a further object to provide a shock absorber hub which can be placed on a wheel, such as the wheels of automobiles, and which elastically connects the wheel with the hub.

The invention has other objects which will be more particularly pointed out in the accompanying description.

Referring now to the drawings, Fig. 1 is a section of the device along the line 1—1 of Fig. 2, showing it applied to the front axle of an automobile;

Fig. 2 is a section along the line 2—2 of Fig. 1;

Figs. 3 and 4 are elevations of the spring housing and retainers;

Fig. 5 is a view similar to Fig. 2, showing a modified construction;

Figs. 6 and 7 are elevations of the housing and spring retainers of the form shown in Fig. 5;

Fig. 8 is a view similar to Fig. 2, showing a further modified construction;

Fig. 9 is a sectional view taken on line 9—9 of Fig. 8;

Fig. 10 is a view of the housing used in connection with Fig. 8;

Fig. 11 is a view of the cover plate used with Fig. 8;

Fig. 12 is a sectional view taken on line 12—12 of Fig. 11; and

Fig. 13 is a view of the spring resisting device of the retainer used with the construction of Fig. 8.

Like numerals refer to like parts through the several figures.

Referring now to the drawings, the front axle 1 has the spindle 2 supported in a main hub 3 and antifriction bearings 4. The brake drum 5 is secured between a flange 6 on the hub and a ring or outer hub 7 onto the main hub. The brake drum and the outer hub are further secured by bolts 8.

A spring seating and spring resisting member 9 is mounted on the outer hub member 7 and held in place by screws 10. A spring housing 11 surrounds the ring 9, and recesses 12 and 12a form seats for the springs 13. The inner ends of the springs 13 are seated in recesses 14 and 14a in the ring 9. The lugs 15—15 which form the recesses 14—14, see Fig. 4, also serve to form a seat for the inner end of a second set of springs 16—16. The outer ends of which are seated on inwardly projecting lugs 17—17 which form the recesses 12a—12a in the housing 11. A flange 18 on the spring housing 11, see Fig. 3, and a cover plate 19, see Fig. 1, secured by bolts 20—20, retain the springs in proper position. The wheel spoke hub 21 is mounted on the face of the cover plate 19 and secured in position by bolts 22—22. The springs 13—13 are radial and take the road shocks and the springs 16—16 are tangential and take the driving thrust.

The construction of Figs. 1-4 may be called a three-point construction due to the three springs 13 in between the members 15, there being therefore a spring located at each of the three points and then there being the bracing springs 16 at each side of these three points, which keep the spring housing from turning around the hub. In other words, there is a triangular spring arrangement and between these triangularly arranged springs are bracing springs.

In Figs. 5, 6 and 7 I have shown a modified construction of the triangular arrangement of the springs. In this construction the spring resisting member 21 is itself arranged in the form of a triangle having three points 22, 23 and 24. A spring 25 is located at each of these points and the spring housing 26 is provided with inwardly projecting members 27, between which the springs are located. On each side of these three points are the bracing springs 28, which engage the resisting member 21 and the spring housing 26. The resisting member 21 also has projections on it, on each side of each spring, to resist the springs against lateral movement.

It will be seen that there is space between the spring housing and the hub to let the spring housing move toward the hub with the springs which give it the proper movement to secure resiliency all the way around the hub. The load lies on the springs at all times and there must be a proper seating of the springs when they are placed in position. Each spring must be under a pressure when placed in position, this pressure depending upon the load and being greater as the load on the hub is greater, this depending on the kind of vehicle with which the hub is used.

One of the important features is the diagonal point at which the springs are placed as the springs must take the torque stress as well as the load stress. In other words, these springs are arranged so that they carry the load at all points and keep the spring housing from turning around on the hub, as there is nothing holding this spring housing from turning except the springs.

As before stated, one of the important features of the construction is the triangular three-point spring arrangement, with the bracing springs on each side of the three points, which keep the spring housing from turning around the hub. I have shown a multiplicity of springs which insures proper strength, but of course some of these springs might be omitted. The device is adaptable for use on the present automobile wheels having brake drums or can be used on other wheels. It will be seen that when the device is in position there is an elastic connection between the hub and the wheel all the way around the hub, which takes care of all the forces and stresses applied to the wheel.

Figs. 8-13 show a further modified construction. In this construction there is a spring resisting member 30, shown in Fig. 13, which surrounds the hub of the wheel. This spring resisting element has four projections, 31, 32, 33, 34. Opposite each of these projections is a spring 35 and located between each of these projections are a plurality of springs 36, the springs 36 having their axes at an angle to the axes of the springs 35. There is a spring housing 37 which the outer ends of the springs engage, the springs being compressed, as before stated, before being placed in between the spring resisting member and the housing. There is cover plate 38 on the outside, which is fastened in position by screws 39, and there is a series of screws 40, the screws 39 and 40 passing through the cover plate in opposite directions.

In all these constructions the springs which take the load have their axes substantially radial with relation to the wheel and the springs which take the torque have their axes at angles to the axes of the other springs.

In this construction, as before stated, the springs are placed under compression when they are placed in position so that when in position they are under compression without any load, and this compression depends on the size of the vehicle and its load. On an ordinary automobile it would be in the neighborhood of 250 pounds compression on each spring when set in. When the load is then put on the wheel there is relative movement between the spring housing and the hub, and this relative movement depends upon the load and roughness of the road. With an ordinary rough road it might be, for example, about $\frac{3}{16}$ of an inch all the way around. The limit of movement in the particular construction shown may be from ⅝ of an inch to an inch, and this gives the vehicle proper spring suspension and takes care of the extraordinary jolts due to roughness of the road.

I have described in detail a particular construction embodying the invention, but it is of course evident that the parts may be varied in many particulars and parts omitted or others added without departing from the spirit of the invention, as embodied in the claims hereto appended, and I therefore do not limit myself to the particular construction shown.

I claim:

1. A shock absorber hub for wheels comprising a series of springs, a spring housing about which said springs are arranged and adapted to fit over the housing and with which one end of the springs engages, means for causing the other ends of the springs to be engaged by the hub, there being a space between the spring housing and the hub, so that the housing can come toward the hub entirely therearound, said springs when in position being under high compression so that they are in a compressed condition throughout their maximum and minimum elongation during the movement of the hub, so that they are never subjected to a reversal of stress when the wheel is in operation.

2. A shock absorber hub for wheels comprising a series of springs, a spring housing about which said springs are arranged and adapted to fit over the housing and with which one end of the springs engages, means for causing the other ends of the springs to be engaged by the hub, there being a space between the spring housing and the hub, so that the housing can come toward the hub entirely therearound, said springs when in position being under high compression so that they are in a compressed condition throughout their maximum and minimum elongation during the movement of the hub, so that they are never subjected to a reversal of stress when the wheel is in operation, there being three of said springs arranged in triangular relation, and bracing springs at each side of each of said triangularly arranged springs.

3. A shock absorber hub for wheels comprising a spring resisting member associated with the hub of the wheel, a spring housing extending therearound, three springs arranged in triangular relation engaging said housing and said spring resisting member, and bracing springs on both sides of each of said triangularly arranged springs, said springs when in position being under high compression so that they are in a compressed condition throughout their maximum and minimum elongation during the movement of the hub, so that they are never subjected to a reversal of stress when the wheel is in operation.

4. A shock absorber hub for wheels comprising a series of single springs, a spring housing about which said springs are arranged, said housing adapted to fit over the hub, one end of each of said springs engaging said housing, means for causing the other ends of said springs to be engaged by the hub, the springs being compressed when in the housing, the housing having spring receiving spaces which hold said springs under compression at all times when the wheel is in operation, there being a space between the spring housing and the hub so that the housing can move toward and away from the hub, entirely therearound, said springs when in position being under high compression so that they are in a compressed condition throughout their maximum and minimum elongation during the movement of the hub, so that they are never subjected to a reversal of stress when the wheel is in operation.

JOHN R. EAID.